United States Patent
Parrott et al.

(10) Patent No.: US 11,396,588 B2
(45) Date of Patent: Jul. 26, 2022

(54) PROCESS AND SYSTEM FOR DEPOLYMERIZING PLASTIC

(71) Applicant: Premirr Plastics Inc., Chapel Hill, NC (US)

(72) Inventors: Matthew Craig Parrott, Chapel Hill, NC (US); James Christopher Luft, Chapel Hill, NC (US); Donald B. Shuping, Pittsboro, NC (US); Michael Dean Mattiace, Chapel Hill, NC (US)

(73) Assignee: Premirr Plastics Inc., Chapel Hill, NC (US)

( * ) Notice: Subject to any disclaimer, the term of this patent is extended or adjusted under 35 U.S.C. 154(b) by 0 days.

(21) Appl. No.: 17/278,133

(22) PCT Filed: Sep. 20, 2019

(86) PCT No.: PCT/US2019/052263
§ 371 (c)(1),
(2) Date: Mar. 19, 2021

(87) PCT Pub. No.: WO2020/061521
PCT Pub. Date: Mar. 26, 2020

(65) Prior Publication Data
US 2021/0332215 A1    Oct. 28, 2021

Related U.S. Application Data

(60) Provisional application No. 62/831,787, filed on Apr. 10, 2019, provisional application No. 62/734,421, filed on Sep. 21, 2018.

(51) Int. Cl.
*C08J 11/24*    (2006.01)

(52) U.S. Cl.
CPC .............. *C08J 11/24* (2013.01); *C08J 2367/02* (2013.01)

(58) Field of Classification Search
USPC ........ 521/48.5; 528/190, 193, 194, 271, 272
See application file for complete search history.

(56) References Cited

U.S. PATENT DOCUMENTS

| 10,508,186 B2 | 12/2019 | Parrott |
| 10,858,493 B2 | 12/2020 | Parrott |
| 2021/0047495 A1 | 2/2021 | Parrott |

FOREIGN PATENT DOCUMENTS

| EP | 1134211 A1 | 9/2001 |
| WO | 2017087752 A1 | 5/2017 |

OTHER PUBLICATIONS

EPO as Examining Authority, PCT/US2019/052263, International Preliminary Report on Patentability (IPER) dated Feb. 15, 2021, 12 pages.

*Primary Examiner* — Terressa Boykin
(74) *Attorney, Agent, or Firm* — Jones Walker LLP

(57) ABSTRACT

A process and a system for continuously depolymerizing plastic is disclosed. The system may comprise a mixer for producing a heterogeneous reaction mixture comprising plastic particles and a solvent, a pump for transmitting the reaction mixture at a particle speed sufficient to maintain the plastic particles in suspension in the solvent, a heating apparatus for heating the reaction mixture to its reaction temperature, a hold tube for maintaining the reaction mixture at or above the reaction temperature to facilitate conversion into a homogeneous reaction solution, and a settling tank to allow a solid reaction product to precipitate from the homogeneous reaction solution once cooled.

8 Claims, 3 Drawing Sheets

PROCESS AND SYSTEM FOR DEPOLYMERIZING PLASTIC

CROSS REFERENCE TO RELATED APPLICATIONS

This application is a national stage application under 35 USC § 371 of PCT/US2019/052263, filed on Sep. 20, 2019, which claims the benefit of U.S. Provisional Application No. U.S. 62/734,421 filed Sep. 21, 2018 and U.S. Provisional Application No. U.S. 62/831,787 filed Apr. 10, 2019, all of which are hereby incorporated by reference.

BACKGROUND

Plastic, especially polyesters such as PET, are conventionally depolymerized in large reaction vessels usually equipped with a heating jacket and an agitator. The depolymerization reaction is sequestered in the vessel until depolymerization is complete. After depolymerization the vessel is emptied and then refilled. Each batch is heated to speed up depolymerization and then cooled to produce viable raw material for new polymers. The batch process typically takes between 20 min and 800 min. Continuous operation is simulated by sequentially emptying and refilling a group of reaction vessels in round-robin fashion. The constant need to fill, heat, cool, empty, and repeat wastes energy and requires additional equipment to maintain the illusion of actual continuous flow in a parallel batch process.

SUMMARY

The invention disclosed herein is generally directed to a process and system for the continuous depolymerization of resin, plastic, or polymer (hereinafter, each generally referred to as "plastic") using a continuous flow system that maintains the flow rate above a minimum threshold necessary to keep the particles suspended in the heterogeneous mixture during processing.

A process embodying features of the invention for depolymerizing plastic comprises: (a) continuously flowing a mixture containing solid plastic particles in a solvent through a line in a heating chamber at a particle speed great enough to maintain the plastic particles suspended in the solvent and prevent the plastic particles from agglomerating and clogging the line; and (b) transferring heat through the line in the heating chamber to heat the mixture to a reaction temperature to start the depolymerization of the plastic particles in the solvent into a homogeneous solution including a liquefied reaction product.

A system embodying features of the invention for the continuous depolymerization of plastic may comprise a mixer (optional), a pump, a first heat exchanger (optional), a heating apparatus including a heating chamber, a second heat exchanger (optional), and a separator. The pump functions to continuously feed a heterogeneous mixture of plastic particles and a solvent through a conduit at a pump flow rate designed to maintain an optimum particle speed. The heterogeneous mixture optionally may first be passed through a first portion of the heat exchanger to preheat the mixture before being transmitted through the heating chamber. The heating chamber, which defines a heating zone, functions to raise the temperature of the heterogeneous mixture flowing through the conduit line to its reaction temperature, thereby starting the process of converting the heterogeneous mixture containing the plastic particles into a homogeneous solution comprising a liquefied reaction product. This conversion process may continue within a hold tube before being routed back through a second portion of the heat exchanger designed to cool the liquefied reaction product. The liquefied reaction product optionally can be further cooled by being routed through a second heat exchanger before being transferred to a separator designed to separate the solid reaction product from the solvent. The separated solvent can be recirculated back to the mixer or intake line of the pump for reuse.

In certain embodiments of the invention, the systems and methods can provide for heating the heterogeneous mixture of plastic and a solvent within the heating chamber via indirect microwave irradiation. Microwave heating relies heavily on the dielectric properties of the material being heated. Because the dielectric properties of plastic materials can vary, the effectiveness of heating a range of materials directly by microwaves varies from material to material. And additives added to the plastic material to improve its dielectric properties can be difficult to remove from the desired end product. The systems and methods of the present invention avoid the inherent shortcomings of direct heating by microwave irradiation by providing a means for indirectly heating the target material using a heating chamber in combination with a heat transfer fluid (HTF) optimized to possess excellent dielectric properties. Since only the HTF is subject to heating via microwave irradiation, any variances in the dielectric properties of the target materials to be heated are immaterial. Thus, target materials with a wide range of dielectric properties can be heated effectively and efficiently using indirect microwave irradiation systems and processes.

In embodiments of the invention utilizing indirect microwave irradiation, the heating zone of the system may comprise a heating apparatus featuring a heating chamber, a microwave applicator, a heat transfer fluid (HTF), and a HTF closed-loop conduit. The heating chamber may have a first passageway that extends from a first inlet to a first outlet and a heating region adjacent the first passageway. The material to be heated (i.e., the target material) may be received in the heating region. The HTF conduit extends through the microwave applicator and connects to the first inlet. The heat transfer fluid, which preferably comprises a microwave absorber dissolved in a solvent, is heated in the microwave applicator as it passes through the HTF conduit. The heated transfer fluid then passes through the first passageway of the heating chamber and heats the target material in the adjacent heating region of the heating chamber. Preferably, the system uses a heat transfer fluid that is precisely formulated and tuned to a specific microwave frequency for efficiently absorbing microwaves and converting the same to heat. This heat can then be transferred to the target material by the heating chamber or any other known means for heating via convection or conduction. The indirect heating via microwave irradiation of the heat transfer fluid having optimal dielectric properties provides exquisite temperature control while simultaneously standardizing and minimizing energy consumption. The system and methods of the present invention can be used to indirectly heat a wide variety of materials including, but not limited to, reactants used in chemical reactions.

In embodiments of the invention utilizing indirect microwave irradiation, a process embodying features of the invention for heating a target material in the system's heating zone comprises: (a) receiving the target material in a heating region of a heating chamber; (b) heating a heat transfer fluid including a solvent and a microwave absorber with microwave energy in a microwave applicator; (c) passing the heated heat transfer fluid through the heating chamber in a first passageway surrounding the heating region to transfer heat from the heat transfer fluid in the first passageway to the target material in the heating region; (e) cooling the reaction mixture to solidify the reaction product; and (f) transferring the reaction mixture to a separator to separate the solid reaction product from the solvent.

In another particular embodiment exemplifying principles of the invention when indirect microwave irradiation is to be utilized, a method of chemically degrading polyethylene terephthalate (PET) to its reactive intermediate, bis(2-hydroxyethyl) terephthalate (BHET), is carried out by: (a) combining PET with ethylene glycol and a catalyst to produce a heterogeneous reaction mixture; (b) pumping the heterogeneous reaction mixture through a first section of a first heat exchanger to preheat the heterogeneous reaction mixture; (c) pumping the preheated heterogeneous reaction mixture into a heating region of a heating chamber; (d) heating a heat transfer fluid with microwave energy in a microwave applicator, wherein the heat transfer fluid comprises a microwave absorber; (e) passing the heated heat transfer fluid through a first passageway of the heating chamber to heat the reaction mixture in the heating region of the heating chamber to a temperature sufficient to produce a homogeneous reaction solution comprising the reaction product BHET; (f) pumping the homogeneous reaction solution through a second section of the first heat exchanger to cool the homogeneous reaction solution; (g) optionally pumping the homogeneous reaction solution through a second heat exchanger to further cool the homogeneous reaction solution; and (h) transferring the reaction solution to a separator to separate the solid reaction product from the solvent. The resultant BHET monomers and BHET oligomers can then can be purified and re-polymerized to form new, virgin PET.

DETAILED DESCRIPTION

Figure 1:
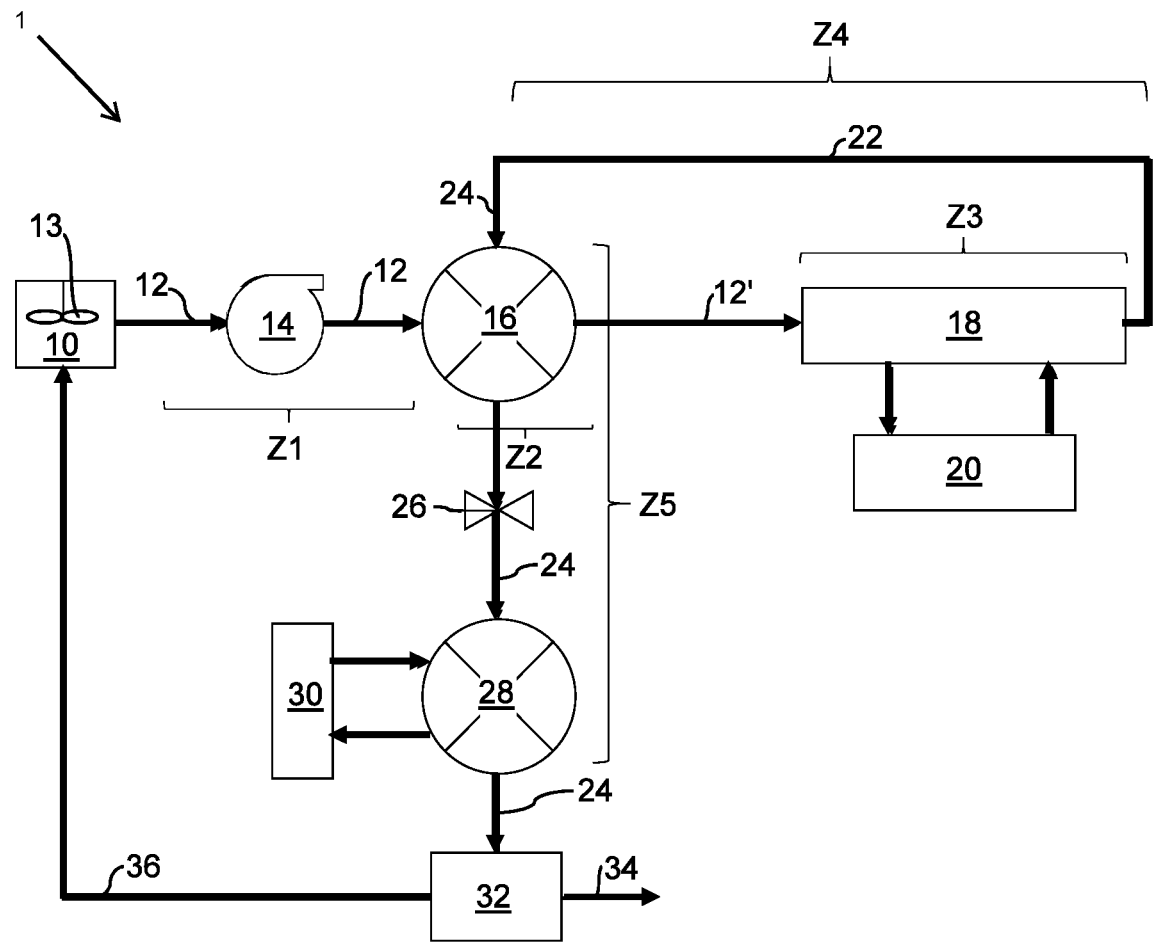
FIG. 1 is a block diagram of a system embodying features of the invention for depolymerizing plastic.
Figure 2:
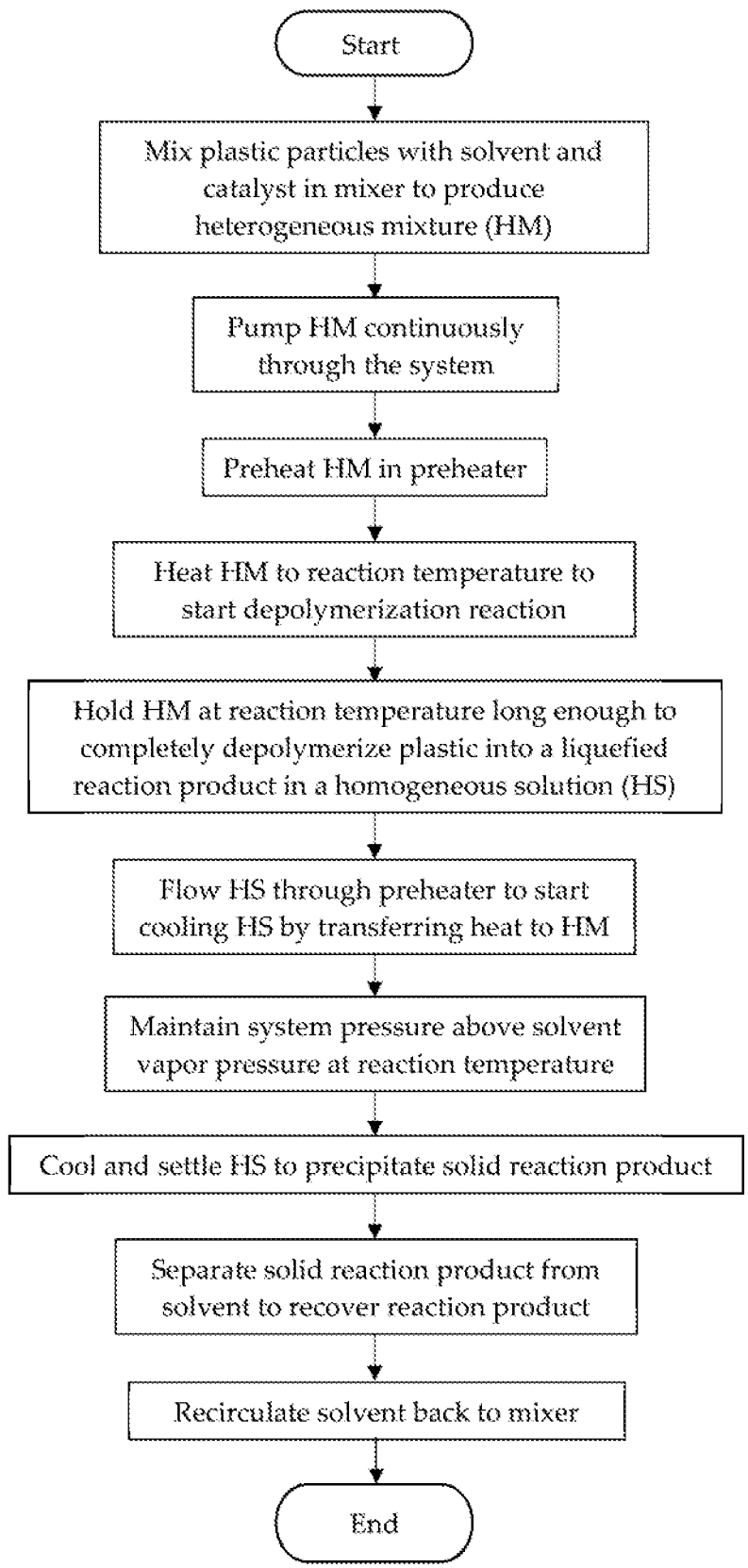
FIG. 2 is a flowchart showing the progression of a volume of plastic undergoing a depolymerization process in the system of FIG. 1.

A system 1 and a process for depolymerizing plastic are shown in FIGS. 1 and 2. The system 1 may comprise a mixer 10; a pump 14; a first heat exchanger 16; a heating apparatus 18,20; a hold tube 22; a back pressure regulator 26; a second heat exchanger 28, and a separator 32. Although the system 1 and process may be used with various plastics, the depolymerization of PET into its reactive intermediate(s) is used as a specific example herein to describe the systems and processes of the present invention.

Solid plastic particles of waste PET material, in the form of flakes, fines, or powder, are mixed with a solvent and a catalyst in a mixer 10 to produce a heterogeneous mixture 12. The mixer 10 can use an agitator, such as a propeller 13, stirrer, or other agitator or a recirculating solvent to do the mixing. Or the mixture can be premixed. Examples of solvents suitable for use with the system 1 include ethylene glycol (EG) diethylene glycol (DEG), methanol, and water. Examples of suitable catalysts include zinc acetate; zinc chloride; manganese acetate; sodium hydroxide; potassium hydroxide; 1, 5, 7-Triazabicyclo[4.4.0]dec-5-ene (TBD); 1, 8-Diazabicyclo[5.4.0]undec-7-ene (DBU); magnesium acetate, 4-dimethylaminopyridine (DMAP); amine; trialkyl amine; and combinations of those catalysts. However, other solvents and catalysts may be utilized and be within the scope of the invention. Depending on the solvent utilized, different depolymerized, reaction products may be produced. For example, when ethylene glycol is utilized, the primary reaction product will be BHET. When diethylene glycol is utilized, the primary reaction product will be bis(diethylene glycol) terephthalate (BDEGT). When methanol is utilized, the primary reaction product will be dimethyl terephthalate (DMT). When water is utilized, the primary reaction product will be terephthalic acid (TA). For the sake of brevity, the system and process of the present invention will be further described herein in the context of the depolymerization of PET in the presence of ethylene glycol to produce the reaction product BHET. However, skilled artisans will readily recognize that alternative reaction products of PET can be produced pursuant to the methods disclosed herein for using the system 1 when alternative solvents are utilized.

Still referring to FIGS. 1 and 2, the heterogeneous mixture 12 may be pumped through a series of connected lines, such as tubes or pipes, by a pump 14. Preferably, the mixture is advanced through the system 1 utilizing the pump 14 only. In other embodiments, agitator(s), auger(s), and/or extruder(s) may be utilized to supplement the pump 14 in advancing the mixture through the system 1. The pump 14 operates at a flow rate great enough to move the mixture 12 through the system 1 with a particle speed great enough to maintain the PET particles suspended in the solvent and to prevent the particles from agglomerating and clogging the lines. By operating continuously without stopping, the pump 14 flows the heterogeneous mixture through the system 1 at a steady rate that makes the conversion of PET into BHET a function of position within the system 1 rather than a function of time—as in batch systems.

An optional first heat exchanger (preheater) 16 is used to preheat the heterogeneous mixture 12. The preheater 16 can heat the heterogeneous mixture 12 by a heat source, such as a flame or a circulated heat transfer fluid. Or the homogeneous solution containing the BHET after the depolymerization reaction can be used in the preheater 16 to transfer heat to the heterogeneous mixture and, in the process, cool itself down. In embodiments utilizing a preheater 16, the heterogeneous mixture 12 will flow from the pump 14, through the preheater 16, and then the preheated heterogeneous mixture 12' will flow continuously into and through a downstream heating chamber 18 of the heating apparatus to initiate the depolymerization process. In embodiments foregoing the use of a preheater 16, the heterogeneous mixture 12 will flow from the pump 14 directly and continuously into and through the downstream heating chamber 18 of the heating apparatus to initiate the depolymerization process.

The heating apparatus may comprise a heating chamber 18 operatively coupled to a heating source 20. The heating chamber 18 may be realized as a reactor heat exchanger that raises the temperature of the heterogeneous mixture to a reaction temperature of at least 230° C. The heterogeneous mixture is heated in the reaction heat exchanger 18 by a heat source 20. The heat source 20 may directly heat the heterogeneous mixture with microwave radiation, direct flame, electrically heated pipe, inductively heated pipe, or ohmically, as a few examples. Alternatively, the heat source 20 may indirectly heat the heterogeneous mixture using a heat transfer fluid. In such embodiments, the heat source 20 may directly heat the heat transfer fluid external to the heating chamber 18, with the heated heat transfer fluid then being pumped into the heating chamber 18 in a separate line adjacent to the line containing the heterogeneous mixture such that heat is transferred from the heat transfer fluid to the heterogeneous mixture. In such an arrangement, heat may be transferred from the heat transfer fluid to the heterogeneous mixture to start depolymerization while keeping the two fluids separate. Examples of suitable transfer fluids are hot oil, a thermal fluid, a molten salt, and steam.

A hold tube 22 after the heating chamber 18 maintains the reaction temperature for at least one minute to complete the conversion of the heterogeneous mixture containing PET to a homogeneous solution 24 containing primarily BHET monomer. The hold tube 22 may be realized by an insulated spool or coil of pipe or tube or as a jacketed pipe. Or the hold tube can be part of the heating chamber rather than a stand-alone component. The reaction is completed in the hold tube. The exiting homogeneous solution contains the solvent, the spent catalyst, and depolymerized PET in the form of a liquefied reaction product that includes BHET monomer, BHET oligomers, BHET half-esters, and mixed esters.

The homogeneous solution 24 is pumped continuously through the optional preheating heat exchanger 16 to cool itself and preheat the incoming heterogeneous mixture 12. A backpressure regulator 26 maintains a system pressure, e.g., 100 psi to 400 psi, above the vapor pressure of the solvent at the reaction temperature.

After flowing through the backpressure regulator 26, the homogeneous solution 24 flows through an optional chilling heat exchanger (chiller) 28 that uses cold water or other cooling heat transfer fluid from a chilled reservoir 30 to remove any excess heat that the preheater 16 did not reclaim.

After the solution is cooled to a temperature below 50° C.—for example, a temperature between about 20° C. and about 40° C.—it is poured into settling tanks and allowed to settle at room temperature for a settling time of between about 0.5 hours and 170 hours while the liquefied BHET monomer, BHET oligomers, the BHET half-esters, and the mixed esters precipitate as a solid reaction product 34 that collects at the bottoms of the tanks. The solid reaction product is then decanted from the solvent. After decanting, the solid reaction product is vacuum filtered and then pressed to further separate it from the solvent and any water in the solution. The decanting from the settling tanks, the vacuum filtering, and the pressing to separate the solid reaction product 34 in the solution 24 from the solvent 36 is represented in FIG. 1 by a separator 32. The solid reaction product 34 containing BHET monomer, BHET oligomers, BHET half-esters, and mixed esters can later be repolymerized to form new, virgin PET. Centrifugation is another example of a separation process that could be used in place of or in addition to decantation and filtration. The separated solvent 36 is recirculated back to the mixer 10 for reuse.

Thus, the system moves the heterogeneous mixture 12 through four zones: Z1—a cold entry zone in which the mixture is fed into the system by the pump 14; Z2—a preheating zone in which the mixture is heated in the preheater 16; Z3—a heating zone in which the mixture is heated to raise its temperature to the reaction temperature; and Z4—a hold zone in which the mixture is maintained at the reaction temperature to complete the conversion of the heterogeneous mixture into the homogeneous solution 24. The homogeneous solution 24 is moved through a cooling zone Z5 in which the homogeneous solution is cooled in the chiller 28 or by the transfer of heat to the incoming heterogeneous mixture 12 in the preheater 16. The pump 14 maintains a continuous flow rate through the system that ensures a particle speed of the heterogeneous mixture great enough to keep the particles in suspension. In that way the plastic particles do not settle in the lines and clog the system.

Preventing the settlement of the plastic particles out of suspension in the heterogeneous mixture 12 is critical to the continuous operability of the system 1. It was discovered that it is necessary to maintain the heterogeneous mixture 12 at a speed of at least 10 cm/s through the system 1 in order to keep the PET particles suspended in ethylene glycol during the depolymerization process. The size of plastic particles pumped through the system 1 can vary, but they are typically between 0.1 μm and 20,000 μm in at least one dimension. To maintain the particles in suspension, the flow rate of the pump 14 should be set to ensure a particle speed of at least 10 cm/s through the system 1, with particle speeds above 20 cm/s or 30 cm/s being preferred in order to provide a safety margin. The heterogeneous mixture velocity can be approximated according to the following equation:

$$\text{Heterogenous Mixture Velocity} = \frac{\text{Pump Flow Rate}}{\text{Cross-sectional area of Pipe}}$$

Thus, the pump flow rate may be set equal to the product of the desired particle speed and the cross-sectional area of the lines (pipes or tubes) through which the mixture is pumped. If mixers are installed in the lines between the pump 14 and the regulator 26, particle speeds lower than 10 cm/s are possible without experiencing settlement and clogging.

In the heating zone Z3, the heating chamber 18 raises the temperature to the reaction temperature—230° C. for PET—or higher to start the depolymerization reaction, which is completed in the hold zone Z4. The length L of the hold tube 22 in the hold zone Z4 depends on its cross-sectional area A, the pump's flow rate Q, and the hold time T required at the reaction temperature to complete the reaction: $L=QT/A$. The hold time can range from 5 min to 10 min or even from 1 min to 60 min. The diameter of the lines running through the zones is 1 cm to 10 cm, but can be as great as 100 cm. If jacketed piping is used, the diameter of the jacket may range from 1.1 to 5.0 times the diameter of the inner pipe through which the mixture is pumped.

Figure 3:
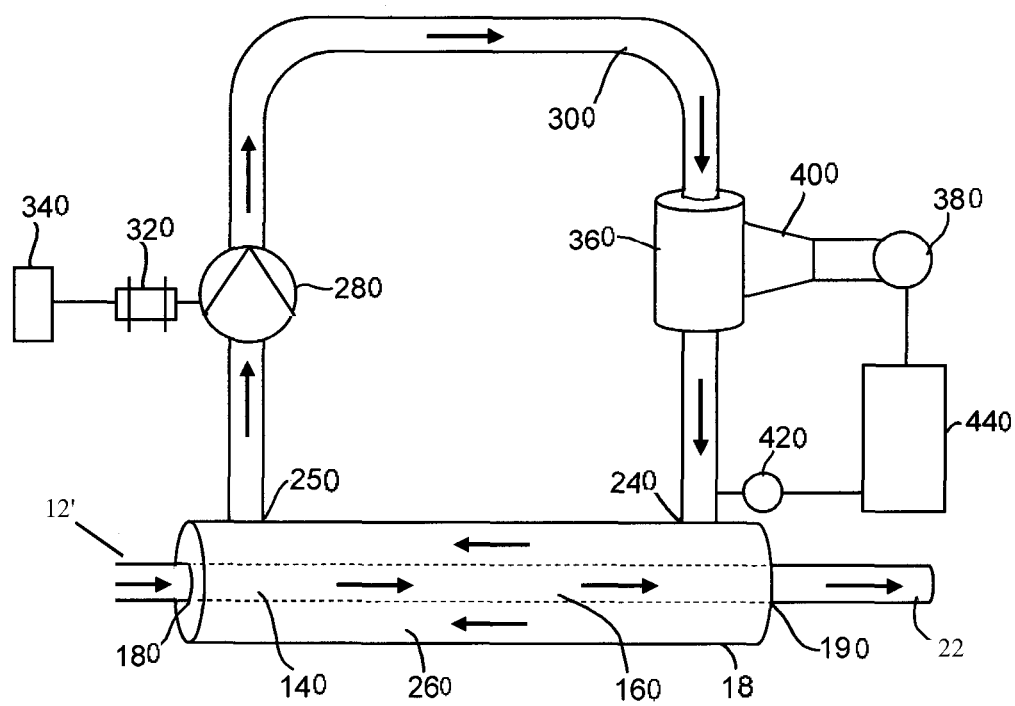
FIG. 3 is a schematic diagram of one version of a system for heating plastic with a microwave-heated heat transfer fluid.

In certain embodiments of the invention, the systems and methods can provide for heating the heterogeneous mixture within the heating chamber 18 via indirect microwave irradiation. An embodiment of the heating zone (Z3) of system 1 utilizing indirect microwave irradiation is shown in FIG. 3. In the depicted embodiment, the heating chamber 18 of the heating apparatus comprises a shell-and-tube reactor heat exchanger, and the heat source 20 of the heating apparatus comprises a microwave assembly. The heating chamber 18 includes a heating region 140 in which the heterogeneous mixture is heated. In this version whereby the heating chamber 18 is a shell-and-tube reactor heat exchanger, the heating region 140 includes a tube 160 defining a passageway through the heating chamber 18 from an entrance port 180 to an exit port 190. The tube 160 is made of a heat-conductive material such as copper or stainless steel, as two examples. And although the material passageway defined by the tube 160 is illustrated in FIG. 3 as a single short pass straight through the heating chamber 18, a much longer passageway following a multi-loop helical, multi-pass serpentine, or other tortuous path to increase the dwell time of the material in the heat exchanger is possible.

In the shell-and-tube heat-exchanger example of FIG. 3, the heterogeneous mixture 12' is pumped into and through the heating chamber 18. Conduit connects to the tube 160 at the entrance port 180. The heated material exiting the heating chamber 18 at the exit port 190 is carried through a hold tube 22 to downstream processing, namely cooling and recovery. Meanwhile, the heat transfer fluid (HTF) enters the heating chamber 18 through an inlet 240 and exits through an outlet 250. A passageway 260 for the HTF extends from the inlet 240 to the outlet 250. The HTF passageway 260 in the example of FIG. 3 is the remaining volume in the interior of the heating chamber 18 not taken up by the tube 160. So the HTF passageway 260 is adjacent to and surrounds the heating region 140 defined by the tube's material passageway 160. In that way heat is transferred from the HTF to the heterogeneous mixture 12'. The HTF is pumped by an HTF pump 280 through the heating chamber 18 via conduit 300 external to the heating chamber. The conduit 300 connects to the inlet 240 and the outlet 250 in a closed-loop recirculation system. The HTF pump 280 is driven by a motor 320 whose speed is controlled by a variable-frequency drive (VFD) 340. The HTF is heated by a microwave assembly comprising a microwave generator 380 connected to a microwave applicator 360 by a waveguide 400. In select embodiments, the microwave applicator 360 is the CHS cylindrical heating system manufactured and sold by Industrial Microwave Systems, L.L.C., of Morrisville, N.C., U.S.A. The HTF passing through the applicator 360 in a microwave-transparent-tube segment of the conduit 300 is irradiated by microwaves propagated through a waveguide 400 into the applicator by a microwave generator 380, such as a magnetron. The microwaves heat the HTF as it passes through the applicator 36 before re-entering the heating chamber 18 to heat the material. The temperature of the HTF entering through the inlet 240 is monitored by a temperature sensor 420 that sends a temperature signal to a controller 440, such as a programmable controller or other programmable computer. The controller 440 increases or decreases the microwave power as the HTF temperature drops too low or rises too high. The controller 440 also adjusts the pump speed as needed by controlling the VFD 34. Because the penetration depth of microwaves in a dielectric material decreases with increasing dielectric loss tangent (tan δ), the diameter of the tube in the microwave applicator should be selected to ensure thorough heating of the HTF. A microwave generator with a power output of between 100 W and 100 kW preferably is used to irradiate the HTF in the microwave applicator to raise its temperature to heat the target material in the heat exchanger.

The described systems and methods utilizing indirect microwave irradiation use an HTF that is precisely formulated and tuned to a specific microwave frequency for efficiently absorbing microwaves and converting them to heat. Microwave heating relies heavily on the dielectric properties of the material being heated. The ability of a material to convert electromagnetic energy to heat depends on temperature, microwave frequency, and the material's loss factor (tan δ). The loss factor is determined by the following equation:

$$\tan \delta = \varepsilon''/\varepsilon'$$

The dielectric constant of a material ($\varepsilon'$) quantifies the ability of a material to be polarized by an electric field. The dielectric loss of a material ($\varepsilon''$) quantifies the material's ability to convert electromagnetic energy to heat. Materials with high tan δ values are known to efficiently absorb microwaves and therefore facilitate rapid heating. Dielectric properties ($\varepsilon'$, $\varepsilon''$, and tan δ) can drastically change with temperature and microwave frequency, but most importantly with the basic constituents that make up the material being heated.

It has been discovered that an HTF comprising a microwave absorber dissolved in a solvent provides a fluid having sufficient dielectric properties, pumpability, and thermal stability to allow for efficient indirect heating of a target material with microwave irradiation. For example, the microwave absorber can comprise a salt capable of increasing the dielectric loss tangent (tan δ) of the HTF and adapting it to microwave heating. In one embodiment, the microwave absorber comprises salts of alkali metals, salts of alkaline earth metals, ammonium salts, sodium salts, potassium salts, lithium salts, rubidium salts, cesium salts, magnesium salts, and beryllium salts. Preferably, the microwave absorber comprises NaCl or KI. Suitable solvents and their blends capable of dissolving one or more of these salts include water, ethylene glycol, glycerol, ethanol, methanol, propylene glycol, diethylene glycol, triethylene glycol, tetraethylene glycol, higher oligomers of ethylene glycol, silicones, polyols, and erthyritol.

In one embodiment, the HTF solution includes enough microwave-absorbing additive to produce a dielectric loss tangent (tan δ) of between about 0.02 and 20 across a microwave frequency range of 10 Hz to 10 GHz and especially at the commercial microwave frequencies of 915 MHz and 2.45 GHz. The HTF may further include common additives such as a buffer to increase shelf life or a pH indicator to denote when the HTF has expired.

EXAMPLES

The following examples, including the experiments conducted and the results achieved, are provided for illustrative purposes only and are not to be construed as limiting the present invention. Tests were performed using readily available alkaline metal salts dissolved in high-boiling-point solvents; namely, ethylene glycol (boiling point=197° C.) and glycerol (boiling point=290° C.). The addition of salt improved the dielectric properties of the resulting HTF solution so that microwave energy was absorbed and converted to heat. Each salt tested was formulated to a concentration of 0.5 mol/L to maintain the same molarity (number of ions) in 100 mL of solvent. For example, 2.922 grams of sodium chloride (NaCl) was dissolved in 100 mL of ethylene glycol to give a molarity of 0.5 M. For potassium iodide (KI) the same molarity was achieved with 8.300 grams in 100 mL of ethylene glycol.

Example 1

Example 1 demonstrates the effect of microwave frequency, microwave absorber selection, and solvent selection on the dielectric loss tangent (tan δ) of the HTF solution. To compare the dielectric properties of each 0.5 M HTF formulation with ethylene glycol as the solvent, a Hewlett-Packard 8753E Network Analyzer was fitted with a 9507B Dielectric Probe. The probe was submerged in 100 mL of each HTF formulation and the dielectric loss tangent (tan δ) was measured at about 175° C. The results of the testing at microwave frequencies of 915 MHz and 2.45 GHz are shown in Table A. The tests show that the sodium and potassium salts improved the dielectric properties more than the lithium salts.

TABLE A

| Salt | LiCl | LiBr | LiI | NaCl | NaBr | NaI | KCl | KBr | KI |
|---|---|---|---|---|---|---|---|---|---|
| tan δ (915 MHz) | 3.27 | 3.84 | 2.83 | 3.90 | 4.26 | 4.79 | 4.26 | 4.29 | 4.84 |
| tan δ (2.45 GHz) | 1.34 | 1.58 | 1.20 | 1.61 | 1.76 | 1.98 | 1.76 | 1.77 | 2.02 |

The tests were repeated for the sodium and potassium salts at 0.5 M in a 100 mL glycerol solvent at about 250° C. The results shown in Table B indicate dielectric loss tangents of about 1.6 and higher.

TABLE B

| Salt | NaCl | NaBr | NaI | KCl | KBr | KI |
|---|---|---|---|---|---|---|
| tan δ (915 MHz) | 4.44 | 4.38 | 4.70 | 4.27 | 4.50 | 4.65 |
| tan δ (2.45 GHz) | 1.60 | 1.64 | 1.72 | 1.58 | 1.58 | 1.76 |

All the salts tested improved the dielectric loss tangent (tan δ) of the resulting HTF solutions. Because of its low cost and ready availability, NaCl is an attractive candidate. Although more expensive, KI is attractive because of its ability to inhibit the corrosion of stainless steel in the presence of an acidic solution.

Example 2

Example 2 demonstrates the effect of increasing the salt concentration on the dielectric loss tangent (tan δ) of the HTF solution. For these tests, four different salts were added to ethylene glycol at about 175° C. at their maximum solubilities. The resulting loss tangents for the four salted HTF solutions and for pure ethylene glycol (EG) are shown in Table C for a microwave frequency of 915 MHz.

TABLE C

| Salt | NaI | KI | LiCl | NaCl | Pure EG |
|---|---|---|---|---|---|
| Salt(g)/100 mL | 100 | 50 | 15 | 7 | 0 |
| Max. Salt Concentration | 6.67 | 3.01 | 3.54 | 1.20 | 0 |
| tan δ (915 MHz) | 34.91 | 20.96 | 13.51 | 6.36 | 0.06 |

Example 3

Example 3 demonstrates that, although the dielectric loss tangent (tan δ) increases with molarity, a molarity range of between 0.05 M and 0.5 M results in a deeper penetration depth and a more uniform heating of the HTF. Test results tabulated in Tables D1 and D2 show the change in penetration depth $D_p$ with temperature for 0.1 M and 0.5 M concentrations of NaCl in EG heated with microwave energy at 915 MHz. All the values below temperatures of 300.0° C. are measurements or values calculated from measurements. Those values were used to fit curves of penetration depth as a function of temperature of the HTF fluid to the data using least-squares curve-fitting. The curves were then used to extrapolate the penetration depth at 300.0° C. Two least-squares curve fits were used: (a) exponential; and (b) power law (square law in this case).

TABLE D2

0.5M NaCl at 915 MHz

| Temperature (° C.) | tanδ | $D_p$ (cm) |
|---|---|---|
| 20.2 | 0.804 | 1.425 |
| 50.3 | 0.642 | 1.575 |
| 75.5 | 0.810 | 1.293 |
| 100.1 | 1.126 | 1.003 |
| 127.1 | 1.688 | 0.759 |
| 150.1 | 2.455 | 0.605 |
| 174.0 | 3.894 | 0.472 |
| *300.0 | 22.517 | 0.138 |
| **300.0 | 25.724 | 0.102 |

Extrapolated from:
*exponential curve fit
**power law curve fit

TABLE D1

0.1M NaCl at 915 MHz

| Temperature (° C.) | tanδ | $D_p$ (cm) |
|---|---|---|
| 22.5 | 0.629 | 1.642 |
| 49.7 | 0.351 | 2.644 |
| 75.0 | 0.307 | 3.093 |
| 107.0 | 0.381 | 2.657 |
| 125.7 | 0.437 | 2.379 |
| 150.3 | 0.620 | 1.811 |
| 174.9 | 0.872 | 1.396 |
| *300.0 | 3.027 | 0.538 |
| **300.0 | 4.615 | 0.732 |

Extrapolated from:
*exponential curve fit
**power law curve fit

The results show that the 0.1 M concentration provided a greater penetration depth than the 0.5 M concentration. For a conduit having a diameter of 2.5 cm, penetration depths $D_p$ for NaCl concentrations of about 0.1 M extended radially about halfway to the center. Penetration depths like those, i.e., penetration depths of about a quarter of the conduit's diameter, should provide adequate heating of the HTF. But the diameter of the microwave-transparent tube carrying the HTF through the microwave applicator can be made thin enough for high-molarity salt concentrations to be thoroughly heated.

Example 4

The indirect heating system and methods described can be used in many heating applications, including chemical processes. For example, heat plays multiple important roles in chemical reactions. In some cases, reactions need heat to begin in order to initiate the breaking of bonds between atoms in the reactants. Heat can also dictate the speed at which reactions occur and the direction of the reaction.

By way of example, the indirect heating system and methods of the present invention can be used to chemically recycle polyethylene terephthalate (PET). PET is one of the most frequently used consumer plastics. Everyday products made from PET include: water bottles, soda bottles, food packaging, clothing, carpeting and filler for furniture. The United States alone consumes more than two million tons of PET plastic annually, with demand increasing each year. This demand puts a growing strain on local landfills and an ever-increasing burden on the environment, as PET is produced from petrochemicals. Glycolysis of PET is one of the most widely studied chemical recycling processes. PET depolymerization by glycolysis involves heating PET and ethylene glycol in the presence of a catalyst. This results in the degradation of PET to a reactive monomer—bis(2-hydroxyethyl) terephthalate monomer (BHET)—which then can be purified and re-polymerized to form new, virgin PET.

WO 2017/087752 to Parrott discloses a method of chemically recycling polyethylene terephthalate (PET) using microwave irradiation and a mixed catalytic system comprising a catalyst and a microwave absorber. However, microwave heating relies heavily on the dielectric properties of the material being heated. Thus, variability in the characteristics (e.g., purity) and concentration of the post-consumer polyethylene terephthalate (pcPET) can lead to noticeable variability in energy consumption during the glycolysis process since direct heating relies exclusively on the intrinsic dielectric properties of the overall heterogeneous reaction mixture.

The indirect microwave heating system of the present invention uses an HTF having predetermined dielectric properties, thereby standardizing the energy consumed during the microwave irradiation heating process and enabling exquisite temperature control. When the system is used to chemically degrade pcPET to its reactive intermediate, BHET, the pcPET can first be mixed with ethylene glycol and a catalyst to create a heterogeneous reaction mixture. Examples of suitable catalysts include zinc acetate, zinc chloride, manganese acetate, 1,5,7-Triazabicyclo[4.4.0]dec-5-ene (TBD), 1,8-Diazabicyclo[5.4.0]undec-7-ene (DBU), magnesium acetate, sodium hydroxide, potassium hydroxide, 4-dimethylaminopyridine (DMAP), and combinations of those catalysts. The heterogeneous reaction mixture can then be pumped through a heating region of a heat exchanger. Meanwhile, an HTF (comprising a microwave absorber dissolved in a solvent) is heated by a microwave applicator and then passed through a first passageway of the heat exchanger. The first passageway of the reactor heat exchanger (i.e., the heating chamber 18) preferably is adjacent to the heat exchanger's heating region, allowing the heterogeneous reaction mixture to be heated by the HTF as the reaction mixture passes through the heating region. The temperature of the HTF and the flow rate through the heat exchanger can be adjusted such that the reaction mixture is heated to a temperature sufficient to produce a reaction product comprising BHET, in which, for example, those parameters are adjusted so that at least 90% by weight of the pcPET is converted to BHET or not more than 10% by weight of the pcPET is converted to mono(2-hydroxyethyl) terephthalate (MHET) in the reaction products. For example, the reaction mixture can be heated to a temperature greater than the boiling point of ethylene glycol or a temperature of at least the melting point of the PET. The resultant BHET monomers and BHET oligomers can then can be purified and re-polymerized to form new, virgin PET. And because the salt is in the HTF and not in the PET mixture, the difficulty in separating it from the BHET is avoided.

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. With regard to the disclosed system utilizing indirect microwave heating in particular, other versions and applications will be immediately envisioned by skilled artisans, such as using multiple applicators to subject the HTF to more microwave heating energy. Lower boiling-point solvents, such as water (boiling point=100° C.), could be used in the HTF solution for heating material in lower-temperature processes than HTF formulations using ethylene glycol or glycerol. Examples of other solvents that could be used with one or more of the salts in the HTF include ethanol, methanol, propylene glycol, diethylene glycol, triethylene glycol, tetraethylene glycol, higher oligomers of ethylene glycol, silicones, erythritol, and polyols. Instead of a salt dissolved in a solvent, the HTF could be composed of nanoparticles as microwave absorbers suspended in a base fluid such as a solvent. So, as these few examples suggest, the scope of the claims is not meant to be limited to the exemplary versions described in detail.

What is claimed is:

1. A process for continuously depolymerizing plastic, the process comprising:
   (a) mixing solid polyethylene terephthalate (PET) particles with a solvent selected from ethylene glycol (EG), diethylene glycol (DEG), methanol and water in the presence of a catalyst selected from zinc acetate, zinc chloride, manganese acetate, sodium hydroxide, potassium hydroxide, 1,5,7-triazabicyclo[4.4.0]dec-5-ene (TBD), 1,8-diazabicyclo[5.4.0]undec-7-ene (DBU); magnesium acetate, 4-dimethylaminopyridine (DMAP), amine, and trialkyl amine, to produce a heterogeneous reaction mixture;
   (b) transmitting the heterogeneous reaction mixture through a first section of a first heat exchanger to preheat the heterogeneous reaction mixture, wherein the heterogeneous reaction mixture is transmitted through the first section of the first heat exchanger at a predetermined flow rate sufficient to maintain a particle speed of above 30 cm/s in order to prevent the solid plastic particles from settling out of suspension;
   (c) transmitting the preheated heterogeneous reaction mixture at the predetermined flow rate into a heating region of a heating chamber;
   (d) heating the heterogeneous reaction mixture within the heating region of the heating chamber with a heat source which indirectly heats the heterogeneous mixture using a heat transfer fluid to a reaction temperature of 230° C. or higher to initiate conversion of the heterogeneous reaction mixture into a homogeneous reaction solution comprising a liquefied reaction product, said liquefied reaction product comprising bis(2-hydroxyethyl) terephthalate (BHET) monomer;
   (e) transmitting the homogeneous reaction solution through a second section of the first heat exchanger to cool the homogeneous reaction solution to a temperature below 50° C.;

(f) transmitting the homogeneous reaction solution to a settling tank and allowing to settle for a settling time of between 0.5 hours and 170 hours to allow the liquefied reaction product to convert into a solid reaction product and precipitate from the cooled homogeneous reaction solution;

and wherein the process further comprises the step of maintaining a system pressure above a vapor pressure of the solvent at the reaction temperature to prevent the solvent from evaporating.

2. The process of claim 1 wherein, in step (d), the liquefied reaction product further contains BHET oligomers, BHET half-esters, and mixed esters.

3. The process of claim 1, wherein after step (d), the process further comprises transmitting the heterogeneous reaction mixture at the predetermined flow rate into a hold tube and maintaining the heterogeneous reaction mixture at the reaction temperature within the hold tube for at least one minute in order to complete the conversion of the heterogeneous reaction mixture into the homogeneous reaction solution comprising the liquefied reaction product.

4. The process of claim 1, wherein after step (e), the process further comprises transmitting the homogeneous reaction solution through a second heat exchanger to further cool the homogeneous reaction solution to a temperature below 50° C.

5. The process of claim 1, wherein step (f) further comprises: separating the solid reaction product from the solvent by decanting, filtering, centrifuging, and pressing.

6. The process of claim 1, wherein after step (j), the process further comprises transmitting the separated solvent to a mixer for producing a new heterogeneous reaction mixture.

7. A system suitable for the continuous depolymerization of polyethylene terephthalate (PET), the system comprising:
    (a) a mixer for producing a heterogeneous reaction mixture comprising solid plastic particles suspended in a solvent;
    (b) a pump fluidly coupled to the mixer, wherein the pump is positioned downstream of the mixer and functions to transmit the heterogeneous reaction mixture through the system at a predetermined flow rate sufficient to maintain a particle speed of at least 30 cm/s in order to prevent the solid plastic particles from settling out of suspension;
    (c) a first heat exchanger positioned downstream of the pump and having a cooling section and a heating section, wherein the heating section of the first heat exchanger is adapted to preheat the heterogeneous reaction mixture;
    (d) a heating apparatus comprising a heating chamber with a heat source configured to indirectly heat the heterogenous mixture using a heat transfer fluid (HTF), the heating chamber including a material passageway having an inlet fluidly coupled to an outlet of the heating section of the first heat exchanger, wherein the material passageway defines a heating region adapted to heat the heterogeneous reaction mixture to at least a reaction temperature sufficient to initiate conversion of the heterogeneous reaction mixture into a homogeneous reaction solution comprising a liquefied reaction product;
    (e) a hold tube adapted to maintain the heterogeneous reaction mixture at or above the reaction temperature in order to complete the conversion of the heterogeneous reaction mixture into a homogeneous reaction solution, the hold tube having a tube inlet and a tube outlet, wherein the tube inlet is fluidly coupled to an outlet of the material passageway of the heating chamber, and wherein tube outlet is fluidly coupled to an inlet of the cooling section of the first heat exchanger;
    (f) a second heat exchanger adapted to cool the homogeneous reaction solution, the second heat exchanger comprising a cooling section having an inlet fluidly coupled to an outlet of the cooling section of the first heat exchanger; and
    (g) a settling tank adapted to receive the cooled homogeneous reaction solution and allow the liquefied reaction product to convert into a solid reaction product and precipitate from the cooled homogeneous reaction solution.

8. The system of claim 7, wherein the heating apparatus further comprises:
    (a) the heating chamber further comprising an HTF passageway adjacent to the material passageway, wherein the HTF passageway comprises a first inlet and a first outlet;
    (b) a HTF conduit having a first end and a second end, wherein the first end of the HTF conduit is connected to the first inlet of the HTF passageway, and wherein the second end of the HTF conduit is connected to the first outlet of the HTF passageway;
    (c) a microwave assembly including a microwave applicator, wherein the microwave applicator is adjacent to the HTF conduit; and
    (d) a heat transfer fluid disposed within the HTF conduit and adapted to be heated by the microwave applicator, wherein the heat transfer fluid includes a solvent and a microwave absorber.

* * * * *